United States Patent
Tsai et al.

(10) Patent No.: US 9,184,922 B2
(45) Date of Patent: Nov. 10, 2015

(54) POWER-OVER-ETHERNET RELAY SYSTEM, POWER INJECTOR AND ACCESS BRIDGE DEVICE

(75) Inventors: Yi-Chang Tsai, Hsinchu County (TW); Kuo-Hong Tseng, Hsinchu County (TW)

(73) Assignee: Wistron NeWeb Corp., Hsinchu County (TW)

( * ) Notice: Subject to any disclaimer, the term of this patent is extended or adjusted under 35 U.S.C. 154(b) by 804 days.

(21) Appl. No.: 13/426,895

(22) Filed: Mar. 22, 2012

(65) Prior Publication Data

US 2012/0242168 A1    Sep. 27, 2012

(30) Foreign Application Priority Data

Mar. 23, 2011   (TW) .............................. 100109878 A

(51) Int. Cl.
  *H04L 12/10*    (2006.01)
(52) U.S. Cl.
  CPC ............... *H04L 12/10* (2013.01); *Y10T 307/74* (2015.04)
(58) Field of Classification Search
  None
  See application file for complete search history.

(56) References Cited

U.S. PATENT DOCUMENTS

| | | | |
|---|---|---|---|
| 7,492,059 B2 * | 2/2009 | Peker et al. | 307/71 |
| 8,013,466 B1 * | 9/2011 | Thompson et al. | 307/1 |
| 8,132,027 B2 * | 3/2012 | Blaha et al. | 713/300 |
| 2007/0047525 A1 * | 3/2007 | He | 370/352 |
| 2007/0278857 A1 * | 12/2007 | Robbins | 307/2 |
| 2007/0288771 A1 * | 12/2007 | Robbins | 713/300 |
| 2008/0074906 A1 * | 3/2008 | Tsai et al. | 363/21.01 |
| 2008/0129118 A1 | 6/2008 | Diab | |
| 2008/0290729 A1 * | 11/2008 | Schoenberg et al. | 307/3 |
| 2009/0063874 A1 * | 3/2009 | Diab | 713/300 |

FOREIGN PATENT DOCUMENTS

| | | |
|---|---|---|
| TW | 2004-12158 A1 | 7/2004 |
| TW | 2008-41636 A | 10/2008 |

OTHER PUBLICATIONS

"APOE03: Redundancy Industrial PoE Adapter", copyright 2009, Alfa Networks. Retrieved from <http://www.taiwantrade.com.tw/EP/resources/member/19257/productcatalog/b62ff8b1-b764-4601-978a-133e25217fc6__APOE03.pdf>. Availability date from Google search: Dec. 26, 2010.*

J. Picard, "Electrical Transient Immunity for Power-Over-Ethernet", revised Aug. 2006, Texas Instruments. Retrieved from <http://www.ti.com/lit/an/slva233a/slva233a.pdf>. Availability date from Google search: Apr. 7, 2006.*

Search Report appended in Office Action issued to Taiwanese Counterpart Application No. 100109878 by the Taiwan Intellectual Property Office on Oct. 30, 2014 along with an English Translation thereof.

* cited by examiner

*Primary Examiner* — Rexford Barnie
*Assistant Examiner* — David Shiao
(74) *Attorney, Agent, or Firm* — Dickstein Shapiro LLP

(57) ABSTRACT

A PoE relay system includes a networking cable, a PoE power injector and a PoE access bridge device. The PoE power injector is coupled to a PoE powering apparatus to receive network data and network power, and to a power supply to receive DC power, and gathers the network data, the network power and the DC power in a gathered signal group. The PoE access bridge device is coupled to the electronic product, receives the gathered signal group, receives the DC power from the gathered signal group for operation, and separates the network data and the network power from each other, and outputs the network power to the electronic product.

21 Claims, 10 Drawing Sheets

POWER-OVER-ETHERNET RELAY SYSTEM, POWER INJECTOR AND ACCESS BRIDGE DEVICE

CROSS-REFERENCE TO RELATED APPLICATION

This application claims priority of Taiwanese Application No. 100109878, filed on Mar. 23, 2011.

BACKGROUND OF THE INVENTION

1. Field of the Invention

The invention relates to a system and device, more particularly, a power-over-Ethernet (PoE) relay system, a power injector and an access bridge device.

2. Description of the Related Art

Under the current infrastructure for Ethernet cabling layout, Power over Ethernet (PoE) is a technology using a networking cable for simultaneously supplying a direct current (DC) power (36V~57V) to a terminal equipment in compliance with PoE specification, such as an IP phone, a wireless access point, a web camera, etc., while supplying network data thereto. It is relatively convenient this way that the terminal equipment can operate properly once it is coupled to a networking cable without the need for additional external power plugs or batteries to supply the power necessary for operation. PoE is also known as Power Over LAN (POL) or Active Ethernet that is compatible with the currently-existing Ethernet system and its clients. The IEEE 802.3at standard is the newest standard of the PoE system that adds a direct-powering-via-a-networking-cable standard to the IEEE 802.3af standard. It is the expansion of the current-existing Ethernet standard and the first international standard with respect to power distribution.

Referring to FIGS. 1 and 2 and according to the IEEE 802.3af standard, a complete PoE system includes: a PoE powering apparatus 21, a PoE powered apparatus 22 and a networking cable 23.

The PoE powering apparatus 21 includes a power sourcing equipment (PSE), two transformers 31, 32, and a connection port (such as a RJ45 connection port) having first to eighth pins 1~8.

The PoE powered apparatus 22 includes a powered device (PD), two transformers 33, 34, and a connection port (such as a RJ45 connection port) having first to eighth pins 1~8.

The networking cable includes four twisted pair cables 35, 36, 37, 38.

The twisted pair cable 35 is electrically coupled between the first and second pins 1, 2 of the PoE powering apparatus 21 and the first and second pins 1, 2 of the PoE powered apparatus 22.

The twisted pair cable 36 is electrically coupled between the fourth and fifth pins 4, 5 of the PoE powering apparatus 21 and the fourth and fifth pins 4, 5 of the PoE powered apparatus 22.

The twisted pair cable 37 is electrically coupled between the seventh and eighth pins 7, 8 of the PoE powering apparatus 21 and the seventh and eighth pins 7, 8 of the PoE powered apparatus 22.

The twisted pair cable 38 is electrically coupled between the third and sixth pins 3, 6 of the PoE powering apparatus 21 and the third and sixth pins 3, 6 of the PoE powered apparatus 22.

Powering in the PoE can be supplied in two ways, one of which is called end-span (as shown in FIGS. 1 and 2), where a DC power is transmitted to the PoE powered apparatus 22 simultaneously with the data signals (explained later), and the other one of which is called mid-span (as shown in FIG. 3), where the DC power is transmitted via the PoE powering apparatus 21 having a mid-span PSE. As the cabling connections of mid-span are similar to those of end-span and can be referred to in the IEEE802.3af standard, it is not described herein.

The end-span can be categorized into two types. The first type powers via the first and second pins 1, 2, and the third and sixth pins 3, 6 of the PoE powering apparatus 21 (as shown in FIG. 2), and the second type powers via the fourth and fifth pins 4, 5, and the seventh and eighth pins 7, 8 of the PoE powering apparatus 21 (as shown in FIG. 1).

As shown in FIG. 1, when the PoE powering apparatus 21 powers via the fourth and fifth pins 4, 5, and the seventh and eighth pins 7, 8, the fourth and fifth pins 4, 5 of the PoE powering apparatus 21 are electrically coupled to a positive terminal of the power sourcing equipment (PSE), while the seventh and eighth pins 7, 8 of the PoE powering apparatus 21 are electrically coupled to a negative terminal of the power sourcing equipment (PSE). The fourth and fifth pins 4, 5 of the PoE powered apparatus 22 are electrically coupled to a positive terminal of the powered device (PD), while the seventh and eighth pins 7, 8 of the PoE powered apparatus 22 are electrically coupled to a negative terminal of the powered device (PD).

As shown in FIG. 2, when the PoE powering apparatus 21 powers using the first and second pins 1, 2 and the third and sixth pins 3, 6, the power sourcing equipment (PSE) powers centers of the transformers 31, 32 by center tapping, while the powered device (PD) is electrically coupled to centers of the transformers 33, 34 also by center tapping without affecting network data transmissions. The first and second pins 1, 2 and the third and fourth pins 3, 6 can be of any polarity.

According to the IEEE 802.3af standard, the PoE powering apparatus 21 can only power through one of the two conditions of FIGS. 1 and 2, while the PoE powered apparatus 22 needs to be able to adapt to both conditions. Such requirement is easily achieved by PoE powered apparatus of 10 Mbps and 100 Mbps as only the first and second pins 1, 2 and the third and sixth pins 3, 6 are used to receive network data.

However, with the advancement of network technology, the PoE cabling infrastructure can now support transmission speeds of 1000 Mbps. At 1000 Mbps, the full use of the twisted pair cables is required for network data transmission, and the PoE relay systems defined in FIGS. 1 to 3 cannot meet all three requirements for 10 Mbps, 100 Mbps and 1000 Mbps simultaneously, thus restricting the development of PoE systems.

With a conventional embodiment of a one-to-many application for a PoE system, there arises a problem of high cost. For example, FIG. 4 shows a network power source unit (S1) having a PoE powering apparatus 21 coupled to two electronic products (P1, P2) that are disposed in a same area respectively via two lengthy networking cables 23. Each of the two electronic products (P1, P2) has a PoE powered apparatus 22. The network power source unit (S1) transmits network data and network power to the two electronic products (P1, P2) via the two networking cables 23. However, the need to use two lengthy networking cables 23 increases the cost.

For another example, FIG. 5 shows another conventional method to implement a one-to-many application in a PoE system with the difference of: the addition of a PoE access bridge device (AP1). The PoE access bridge device (AP1) has a PoE powered apparatus 22 electrically coupled to the PoE powering apparatus 21 of the network power source unit (S1)

via a networking cable 23 to receive the network data and the network power, and a PoE powering apparatus 21 coupled to the two electronic products (P1, P2) respectively via two short networking cables 24. The PoE access bridge device (AP1) divides the network data. The PoE powering apparatus 21 of the PoE access bridge device (AP1) generates power to be carried with the divided network data to the two electronic products (P1, P2). Although the cost of providing lengthy networking cables 23 is saved, the use of costly PoE powering and powered apparatuses 21, 22 in the PoE access bridge device (AP1) increases cost. Also, the network power of 36V to 57V needs to be down converted to the range of between 5V and 12V so as power the PoE access bridge device (AP1), therefore the PoE access bridge device (AP1) will need an extra step-down converter (not shown in figure) that will further increase the hardware cost.

SUMMARY OF THE INVENTION

Therefore, the first object of the present invention is to provide a PoE relay system that can save cost.

The Power-over-Ethernet (PoE) relay system is adapted to be electrically connected to a network power source unit including a PoE powering apparatus, a power supply to provide direct current (DC) power, and an electronic product including a PoE powered apparatus. The PoE powering apparatus provides network data and network power carried on the network data. The PoE relay system includes a first networking cable, a PoE power injector and a PoE access bridge device.

The PoE power injector is adapted to be electrically coupled to the PoE powering apparatus via a second networking cable to receive the network data and the network power therefrom, is further adapted to be electrically coupled to the power supply to receive the DC power therefrom, and gathers the network data, the network power and the DC power in a gathered signal group.

The PoE access bridge device is electrically coupled to the PoE power injector via the first networking cable to receive the gathered signal group therefrom, and is adapted to be electrically coupled to the electronic product.

The PoE access bridge device receives the DC power from the gathered signal group for operation, separates the network data and the network power of the gathered signal group from each other, and outputs the network power to the PoE powered apparatus of the electronic product via a third networking cable.

The second object of the present invention is to provide a Power-over-Ethernet (PoE) access bridge device.

The PoE access bridge device is adapted to receive a gathered signal group and is adapted to be electrically coupled to an electronic product including a PoE powered apparatus. The gathered signal group includes network data and network power provided by a PoE powering apparatus, and direct current (DC) power provided by a power supply. The PoE access bridge device includes a first PoE connection port, a bias voltage provider, a transformer unit and a second PoE connection port.

The first PoE connection port is adapted to be electrically coupled to a networking cable to receive the gathered signal group.

The bias voltage provider is electrically coupled to the first PoE connection port to receive the DC power from the gathered signal group.

The transformer unit is electrically coupled to the first PoE connection port to receive the network data and the network power of the gathered signal group therefrom, separates the network data and network power, and outputs the network power.

The second PoE connection port is electrically coupled to the transformer unit to receive the network power therefrom, and is adapted to be electrically coupled to the PoE powered apparatus of the electronic product via another networking cable to output the network power thereto.

The third object of the present invention is to provide a Power-over-Ethernet (PoE) power injector.

The PoE power injector includes a first PoE connection port, a direct current (DC) connection port and a second PoE connection port The first PoE connection port is adapted to be electrically coupled to a PoE powering apparatus via a networking cable to receive network data and network power therefrom.

The DC connection port is adapted to be electrically coupled to a power supply to receive DC power therefrom.

The second PoE connection port is electrically coupled to the first PoE connection port to receive the network data and network power therefrom, is electrically coupled to the DC connection port to receive the DC power therefrom, and gathers the network data, the network power and the DC power into a gathered signal group.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE EMBODIMENTS

Figure 1:
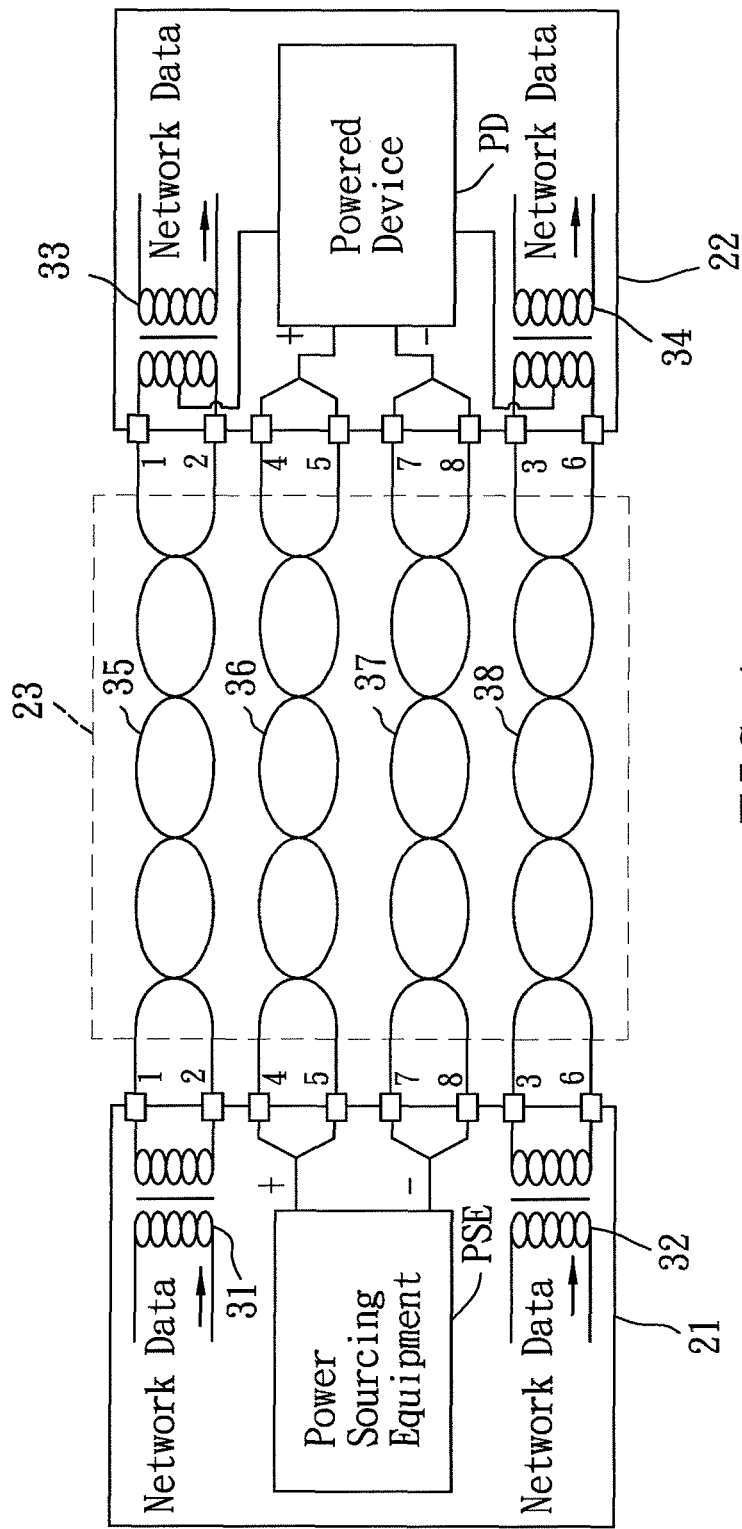
FIG. 1 is a schematic circuit diagram of a first conventional Power-over-Ethernet (PoE) powering device showing one type of an end-span powering configuration.

Before the present invention is described in greater detail, it should be noted that like elements are denoted by the same reference numerals throughout the disclosure.

Figure 6:
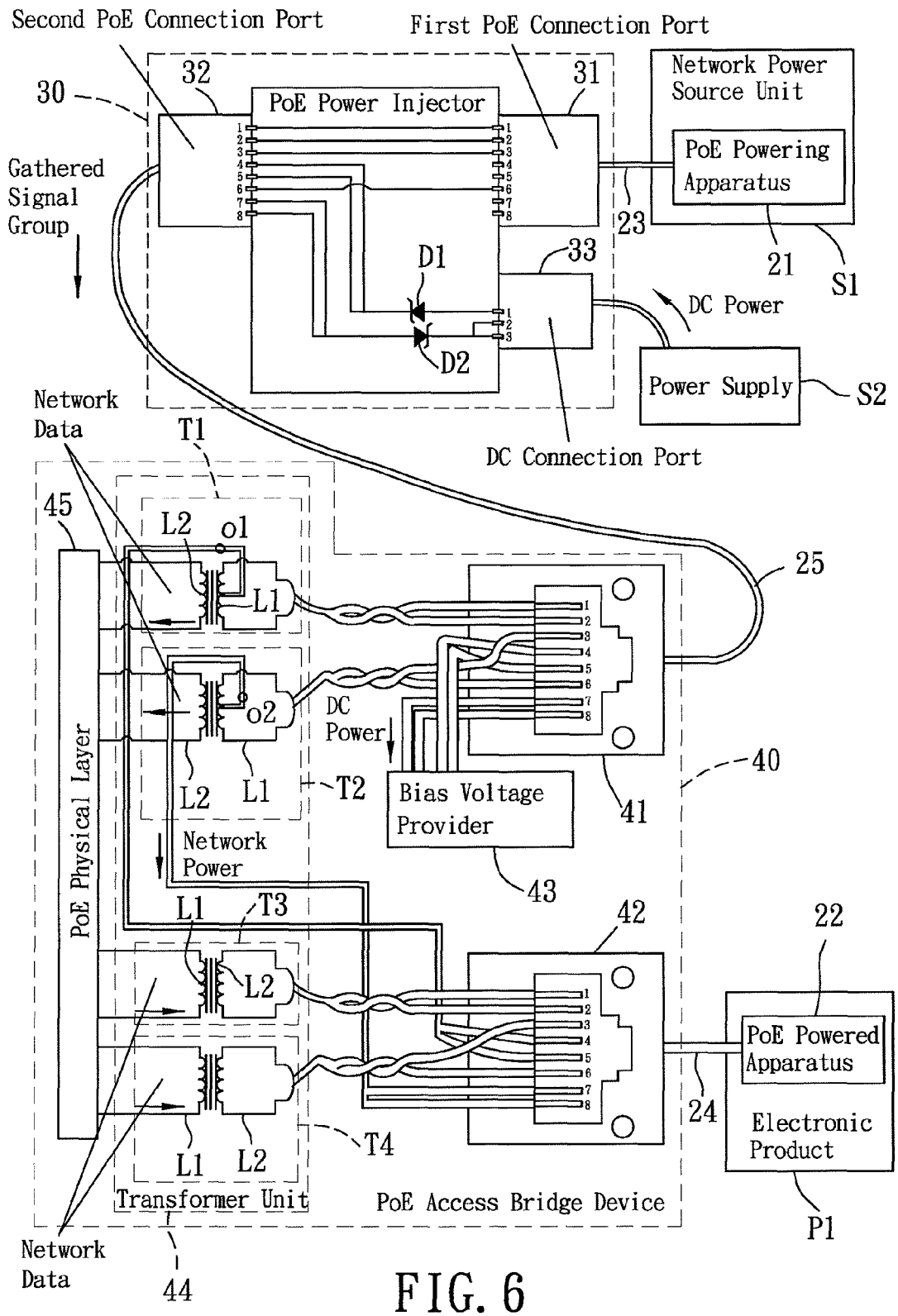
FIG. 6 is a schematic circuit diagram of the first embodiment of a PoE relay system of the present invention.

FIG. 6 shows the first embodiment of the Power-over-Ethernet (PoE) relay system of the present invention. The PoE relay system has PoE functionality and is adapted to be electrically coupled to a power supply (S2) to provide a direct current (DC) power of between 5 to 12 Volts, to a network power source unit (S1) including a PoE powering apparatus 21 via a networking cable 23 (for example, a twisted pair cable, Ethernet crossover cable), and to an electronic product (P1) including a PoE powered apparatus 22 via another networking cable 24. The PoE powering apparatus 21 of the network power source unit (S1) provides network data and network power of between 36 to 57 Volts and carried on the network data to the PoE powered apparatus 22. Each of the PoE powering apparatus 21 and the PoE powered apparatus 22 has first to eighth pins 1-8. The PoE relay system includes a first networking cable 25, a PoE power injector 30 and a PoE access bridge device 40. It is noted that the networking cable 23 is alternatively referred to as a second networking cable 23, while the networking cable 24 is alternatively referred to as a third networking cable 24 in the following descriptions.

The PoE power injector 30 is adapted to be electrically coupled to the PoE powering apparatus 21 via the second networking cable 23 so as to receive the network data and the network power therefrom, is further adapted to be electrically coupled to the power supply (S2) so as to receive the DC power therefrom, and gathers the network data, the network power and the DC power in a gathered signal group.

The PoE access bridge device 40 is electrically coupled to the PoE power injector 30 via the first networking cable 25 so as to receive the gathered signal group therefrom, and is adapted to be electrically coupled to the electronic product (P1). The PoE access bridge device 40 receives the DC power from the gathered signal group for operation, separates the network data and the network power of the gathered signal group from each other using centertapping method, and outputs the network power to the PoE powered apparatus 22 of the electronic product (P1) via the third networking cable 24.

In this embodiment, the PoE power injector 30 includes a first PoE connection port 31, a direct current (DC) connection port 33, a second PoE connection port 32, a first diode (D1) and a second diode (D2).

The first PoE connection port 31 of the PoE power injector 30 is adapted to be electrically coupled to the PoE powering apparatus 21 via the second networking cable 23 so as to receive the network data and the network power therefrom.

The DC connection port 33 is adapted to be electrically coupled to the power supply (S2) so as to receive the DC power therefrom.

The second PoE connection port 32 of the PoE power injector 30 is electrically coupled to the first PoE connection port 31 of the PoE power injector 30 so as to receive the network data and network power therefrom, and is electrically coupled to the DC connection port 33 so as to receive the DC power therefrom, and gathers the network data, the network power and the DC power into the gathered signal group.

The first and second PoE connection ports 31, 32 of the PoE power injector 30 may be RJ45 connection ports commonly used in network systems.

Each of the first and second PoE connection ports 31, 32 of the PoE power injector 30 has first to eighth pins. The first, second, third and sixth pins 1, 2, 3, 6 of the first PoE connection port 31 of the PoE power injector 30 receives the network data and the network power from the PoE powering apparatus 21 via the second networking cable 23. The first, second, third and sixth pins 1, 2, 3, 6 of the second PoE connection port 32 of the PoE power injector 30 are respectively and electrically coupled to the first, second, third and sixth pins 1, 2, 3, 6 of the first PoE connection port 31 of the PoE power injector 30 so as to receive the network data and the network power therefrom.

The DC connection port 33 of the PoE power injector 30 is used to electrically couple to a power source terminal, such as the power supply (S2), and includes first to third pins 1-3.

The first diode (D1) of the PoE power injector 30 has an anode electrically coupled to the first pin 1 of the DC connection port 33, and a cathode electrically coupled to the fourth and fifth pins 4, 5 of the second PoE connection port 32 of the PoE power injector 30. The second diode (D2) has an anode electrically coupled to the seventh and eighth pins 7, 8 of the second PoE connection port 32 of the PoE power injector 30, and a cathode electrically coupled to the second and third pins 2, 3 of the DC connection port 33. The first and second diodes (D1, D2) switch between conducting and non-conducting states according to a voltage magnitude of the DC power, and allow for the DC power to be delivered from the DC connection port 33 to the second PoE connection port 32 of the PoE power injector 30 when in the conducting state.

The PoE access bridge device 40 includes a first PoE connection port 41, a second PoE connection port 42, a bias voltage provider 43, a transformer unit 44, and a PoE physical layer 45.

The first PoE connection port 41 of the PoE access bridge device 40 is electrically coupled to the PoE power injector 30 via the first networking cable 25 so as to receive the gathered signal group therefrom, and has first to eighth pins 1-8. Specifically, the first to eighth pins 1-8 of the first PoE connection port 41 of the PoE access bridge device 40 are respectively and electrically coupled to the first to eighth pins 1-8 of the second PoE connection port 32 of the PoE power injector device 30 via the first networking cable 25.

The second PoE connection port 42 of the PoE access bridge device 40 is adapted to be electrically coupled to the PoE powered apparatus 22 of the first electronic product (P1), and has first to eighth pins 1-8.

The bias voltage provider 43 is electrically coupled to the fourth, fifth, seventh and eighth pins 4, 5, 7, 8 of the first PoE connection port 41 so as to retrieve the DC power from the gathered signal group.

The transformer unit 44 is electrically coupled to the first, second, third and sixth pins 1, 2, 3, 6 of the first PoE connection port 41 to receive the network data and the network power of the gathered signal group therefrom, and is electrically coupled to the PoE physical layer 45 and the first to eighth pins 1-8 of the second PoE connection port 42. The transformer unit 44 separates the network data and network power by using centertapping method, and outputs the network power to the fourth, fifth, seventh and eighth pins 4, 5, 7, 8 of the second PoE connection port 42 of the PoE access bridge device 40. The influence of high voltage impulse on the PoE physical layer 45 is thus prevented to comply with the safety standards of PoE networks.

The PoE physical layer 45 is electrically coupled to the transformer unit 44 to receive the network data from the first, second, third and sixth pins 1, 2, 3, 6 of the first PoE connection port 41 of the PoE access bridge device 40, and delivers the network data back to the transformer unit 44 for subsequent output by the transformer unit 44 to the first, second, third and sixth pins 1, 2, 3, 6 of the second PoE connection port 42 of the PoE access bridge device 40.

The second PoE connection port 42 of the PoE access bridge device 40 is electrically coupled to the transformer unit 44 to receive the network power therefrom, and is adapted to be electrically coupled to the PoE powered apparatus 22 of the electronic product (P1) via the third networking cable 24 so as to output the network power thereto via the third networking cable 24.

The first and second PoE connection ports 41, 42 of the PoE access bridge device 40 may be RJ45 connection ports commonly used in network systems.

The transformer unit 44 includes a first transformer (T1), a second transformer (T2), a third transformer (T3) and a fourth transformer (T4).

The first transformer (T1) has a primary winding (L1) electrically coupled to the first and second pins 1, 2 of the first PoE connection port 41 of the PoE access bridge device 40, a secondary winding (L2) electrically coupled to the PoE physical layer 45, and a first center tap (o1) disposed in the middle of the primary winding (L1) of the first transformer (T1) and electrically coupled to the fourth and fifth pins 4, 5 of the second PoE connection port 42 of the PoE access bridge device 40.

The second transformer (T2) has a primary winding (L1) electrically coupled to the third and sixth pins 3, 6 of the first PoE connection port 41 of the PoE access bridge device 40, a secondary winding (L2) electrically coupled to the PoE physical layer 45, and a second center tap (o2) disposed in the middle of the primary winding (L1) of the second transformer (T2) and electrically coupled to the seventh and eighth pins 7, 8 of the second PoE connection port 42 of the PoE access bridge device 40.

The primary windings (L1) of the first and second transformers (T1, T2) receive the network power and the network data of the gathered signal group from the first PoE connection port 41 of the PoE access bridge device 40. The network power is extracted by the first and second center taps (o1, o2) so as to be delivered to the second PoE connection port 42 of the PoE access bridge device 40. The network data is delivered to the PoE physical layer 45 by induction between the primary and secondary windings (L1, L2) of each of the first and second transformers (T1, T2). In other words, the network data and the network power from the first PoE connection port 41 of the PoE access bridge device 40 are separated by the first and second transformers (T1, T2).

The third transformer (T3) has a primary winding (L1) electrically coupled to the PoE physical layer 45, and a secondary winding (L2) electrically coupled between the first and second pins 1, 2 of the second PoE connection 42 port of the PoE access bridge device 40.

The fourth transformer (T4) has a primary winding (L1) electrically coupled to the PoE physical layer 45, and a secondary winding (L2) electrically coupled between the third and sixth pins 3, 6 of the second PoE connection port 42 of the PoE access bridge device 40.

The primary windings (L1) of the third and fourth transformers (T3, T4) receive the network data from the PoE physical layer 45, and the network data is delivered to the second PoE connection port 42 of the PoE access bridge device 40 by induction between the primary and secondary windings (L1, L2) of each of the third and fourth transformers (T3, T4).

Figure 2:
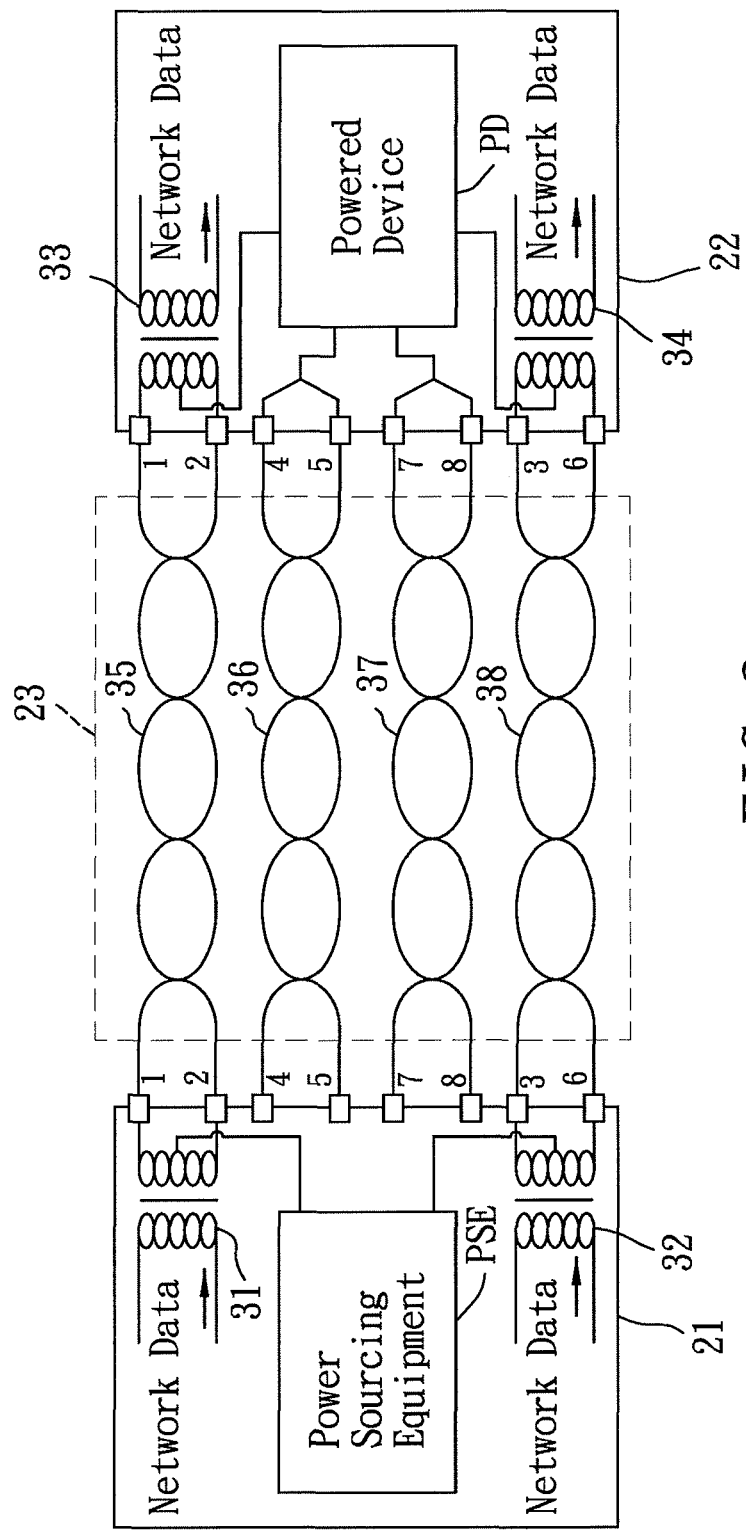
FIG. 2 is a schematic circuit diagram of a second conventional PoE powering device showing another type of the end-span powering configuration.
Figure 3:
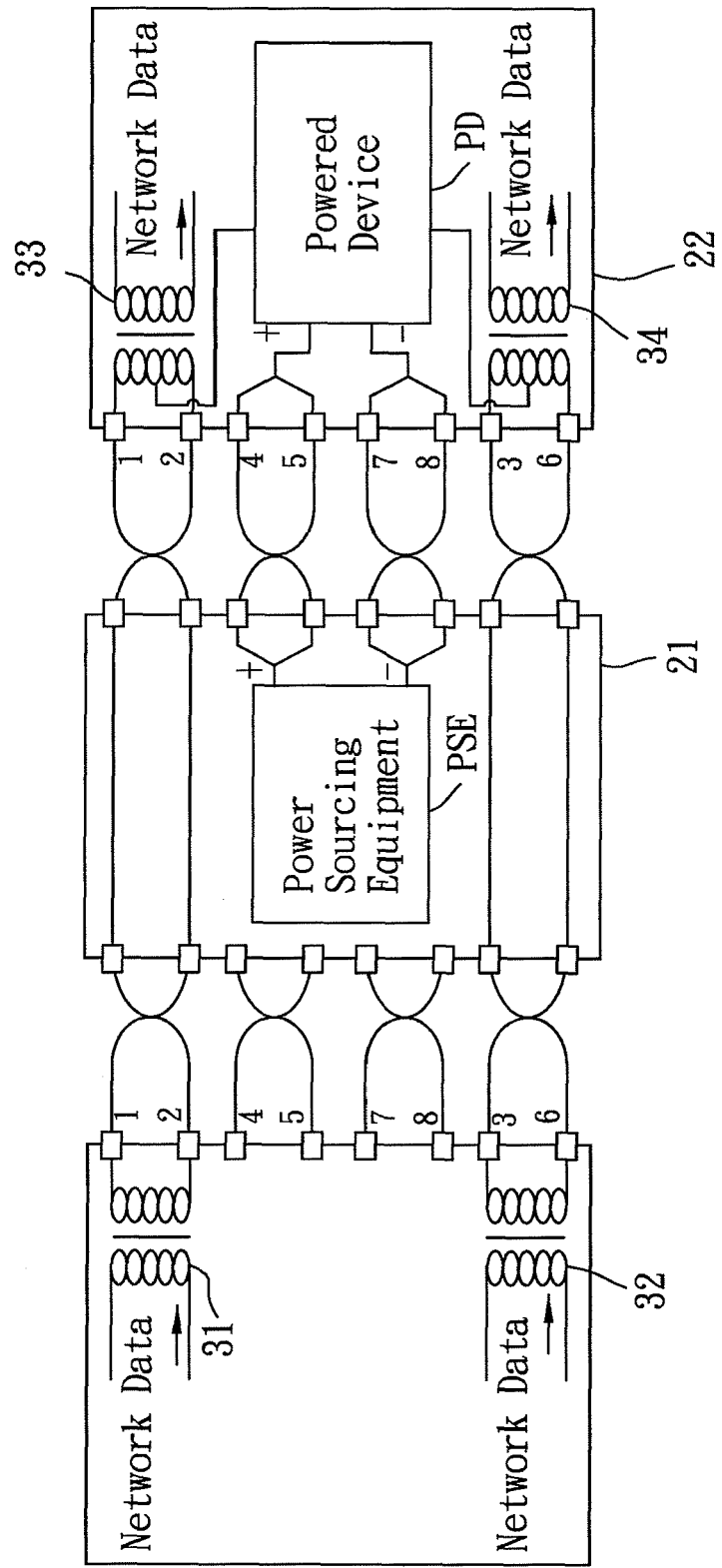
FIG. 3 is a schematic circuit diagram of a third conventional PoE powering device showing a mid-span powering configuration.

The transmission path of the above mentioned first embodiment of the present invention will be described in the following with an example. When 100 M/10 Mbps transmission speed is used, and with the PoE powering apparatus 21 of the network power source unit (S1) serving as the PoE powering apparatus 21 shown in FIG. 2, and under the premise that the first to eighth pins 1-8 of the PoE powered apparatus 22 is respectively and electrically coupled to the first to eighth pins 1-8 of the second PoE connection port 42, the network power is transmitted sequentially through the first, second, third and sixth pins 1, 2, 3, 6 of the PoE powering apparatus 21, the first, second, third and sixth pins 1, 2, 3, 6 of the first PoE connection port 31 of the PoE power injector 30, the first, second, third and sixth pins 1, 2, 3, 6 of the second PoE connection port 32 of the PoE power injector 30, the first, second, third and sixth pins 1, 2, 3, 6 of the first PoE connection port 41 of the PoE access bridge device 40, the primary windings (L1) of the first and second transformers (T1, T2), the first and second center taps (o1, o2), the fourth, fifth, seventh and eighth pins 4, 5, 7, 8 of the second PoE connection port 42 of the PoE access bridge device 40, and finally the fourth, fifth, sixth seventh and eighth pins 4, 5, 7, 8 of the PoE powered apparatus 22 of the electronic product (P1).

The DC power is transmitted sequentially through the DC connection port 33 of the PoE power injector 30, the first and second diodes (D1, D2), the fourth, fifth, seventh and eighth pins 4, 5, 7, 8 of the first PoE connection port 32 of the PoE power injector 30, and the fourth, fifth, seventh and eighth pins 4, 5, 7, 8 of the first PoE connection port 41 of the PoE access bridge device 40, and finally to the bias voltage provider 43.

The network data is transmitted sequentially through the first, second, third and sixth pins 1, 2, 3, 6 of the PoE powering apparatus 21, the first, second, third and sixth pins 1, 2, 3, 6 of the first PoE connection port 31 of the PoE power injector 30, the first, second, third and sixth pins 1, 2, 3, 6 of the second PoE connection port 32 of the PoE power injector 30, the first, second, third and sixth pins 1, 2, 3, 6 of the first PoE connection port 41 of the PoE access bridge device 40, the primary windings (L1) of the first and second transformers (T1, T2), the secondary windings (L2) of the first and second transformers (T1, T2), the PoE physical layer 45, the primary windings (L1) of the third and fourth transformers (T3, T4), the secondary windings (L2) of the third and fourth transformers (T3, T4), the first, second, third and sixth pins 1, 2, 3, 6 of the second PoE connection port 42 of the PoE access bridge device 40, and finally the first, second, third and sixth pins 1, 2, 3, 6 of the PoE powered apparatus 22 of the electronic product (P1).

Figure 7:
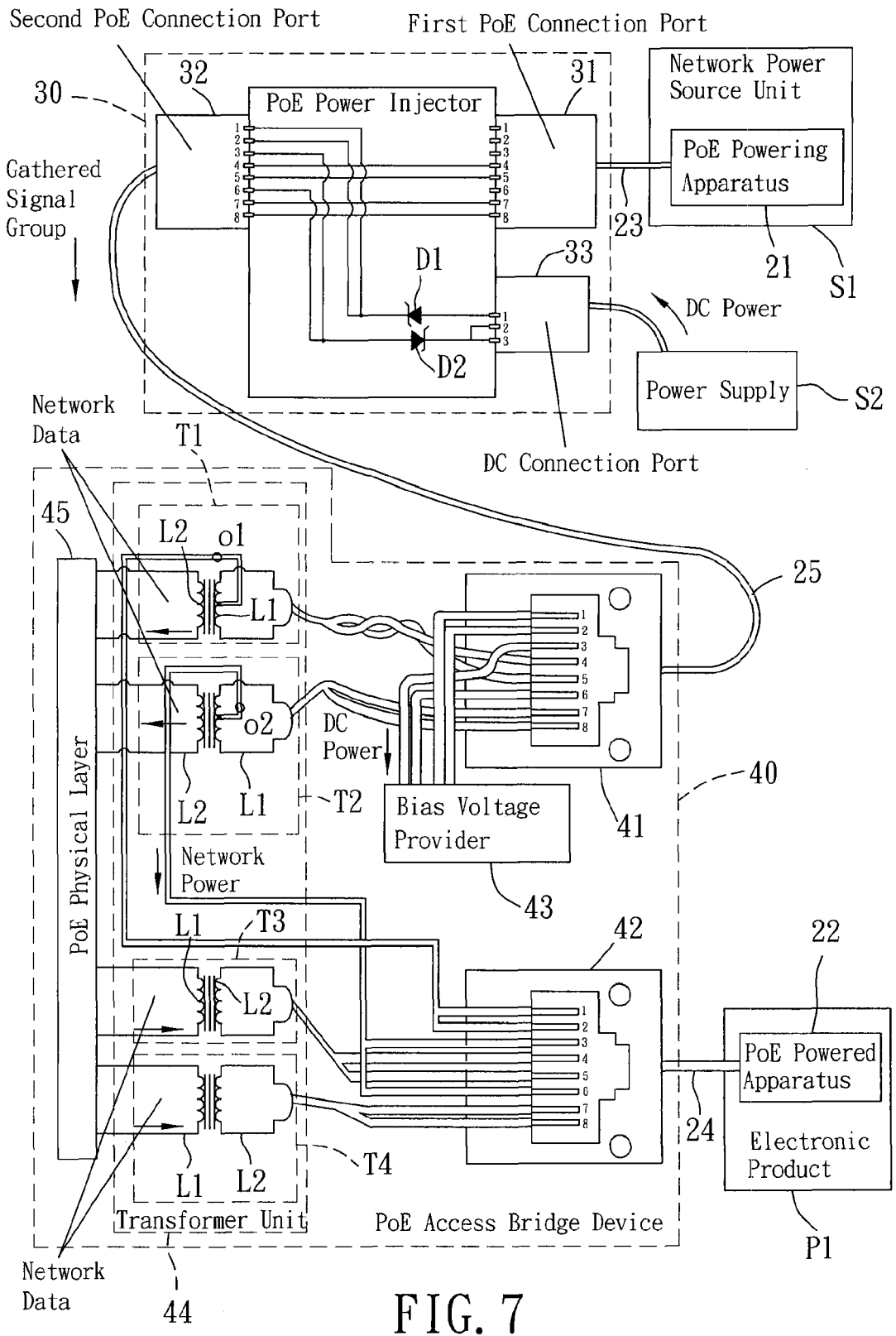
FIG. 7 is a schematic circuit diagram of a variant form of the first embodiment.

A variant form of the first embodiment of the present invention is shown in FIG. 7, and has the following differences from FIG. 6.

The fourth, fifth, seventh and eighth pins 4, 5, 7, 8 of the first PoE connection port 31 of the PoE power injector 30 are respectively and electrically coupled to the fourth, fifth, seventh and eighth pins 4, 5, 7, 8 of the second PoE connection port 32 of the PoE power injector 30.

The cathode of the first diode (D1) is electrically coupled to the first and second pins 1, 2 of the second PoE connection port 32 of the PoE power injector 30. The anode of the second diode (D2) is electrically coupled to the third and sixth pins 3, 6 of the second PoE connection port 32 of the PoE power injector 30.

The bias voltage provider 43 is electrically coupled to the first, second, third and sixth pins 1, 2, 3, 6 of the first PoE connection port 41 of the PoE access bridge device 40.

The primary winding (L1) of the first transformer (T1) is electrically coupled to the fourth and fifth pins 4, 5 of the first PoE connection port 41 of the PoE access bridge device 40.

The primary winding (L1) of the second transformer (T2) is electrically coupled to the seventh and eighth pins 7, 8 of the first PoE connection port 41 of the PoE access bridge device 40.

The first center tap (o1) is electrically coupled to the first and second pins 1, 2 of the second PoE connection port 42 of the PoE access bridge device 40.

The second center tap (o2) is electrically coupled to the third and sixth pins 3, 6 of the second PoE connection port 42 of the PoE access bridge device 40.

The secondary winding (L2) of the third transformer (T3) is electrically coupled to the fourth and fifth pins 4, 5 of the second PoE connection port 42 of the PoE access bridge device 40.

The secondary winding (L2) of the fourth transformer (T4) is electrically coupled to the seventh and eighth pins 7, 8 of the second PoE connection port 42 of the PoE access bridge device 40.

The transmission path of the above variant of the first embodiment of the present invention will be described in the following with an example. When 100 M/10 Mbps transmission speed is used, and if the fourth, fifth, seventh and eighth pins 4, 5, 7, 8 of the PoE powering apparatus 21 of the network power source unit (S1) are used to simultaneously transmit the network data and the network power, and under the premise that the first to eighth pins 1-8 of the PoE powered apparatus 22 is respectively and electrically coupled to the first to eighth pins 1-8 of the second PoE connection port 42, then the network power is transmitted sequentially through the fourth, fifth, seventh and eighth pins 4, 5, 7, 8 of the PoE powering apparatus 21, the fourth, fifth, seventh and eighth pins 4, 5, 7, 8 of the first PoE connection port 31 of the PoE power injector 30, the fourth, fifth, seventh and eighth pins 4, 5, 7, 8 of the second PoE connection port 32 of the PoE power injector 30, the fourth, fifth, seventh and eighth pins 4, 5, 7, 8 of the first PoE connection port 41 of the PoE access bridge device 40, the primary windings (L1) of the first and second transformers (T1, T2), the first and second center taps (o1, o2), the first, second, third and sixth pins 1, 2, 3, 6 of the second PoE connection port 42 of the PoE access bridge device 40, and finally to the first, second, third and sixth pins 1, 2, 3, 6 of the PoE powered apparatus 22 of the electronic product (P1).

The DC power is transmitted sequentially through the DC connection port 33 of the PoE power injector 30, the first and second diodes (D1, D2), the first, second, third and sixth pins 1, 2, 3, 6 of the second PoE connection port 32 of the PoE power injector 30, and the first, second, third and sixth pins 1, 2, 3, 6 of the first PoE connection port 41 of the PoE access bridge device 40, and finally to the bias voltage provider 43.

The difference in the transmission path of the network data from the network power is that after transmitting through the primary windings (L1) of the first and second transformers (T1, T2), the network data is transmitted respectively through the secondary windings (L2) of the first and second transformers (T1, T2), the PoE physical layer 45, the primary windings (L1) of the third and fourth transformers (T3, T4), the secondary windings (L2) of the third and fourth transformers (T3, T4), and the fourth, fifth, seventh and eighth pins 4, 5, 7, 8 of the second PoE connection port 42 of the PoE access bridge device 40, and finally to the electronic product (P1).

Figure 8:
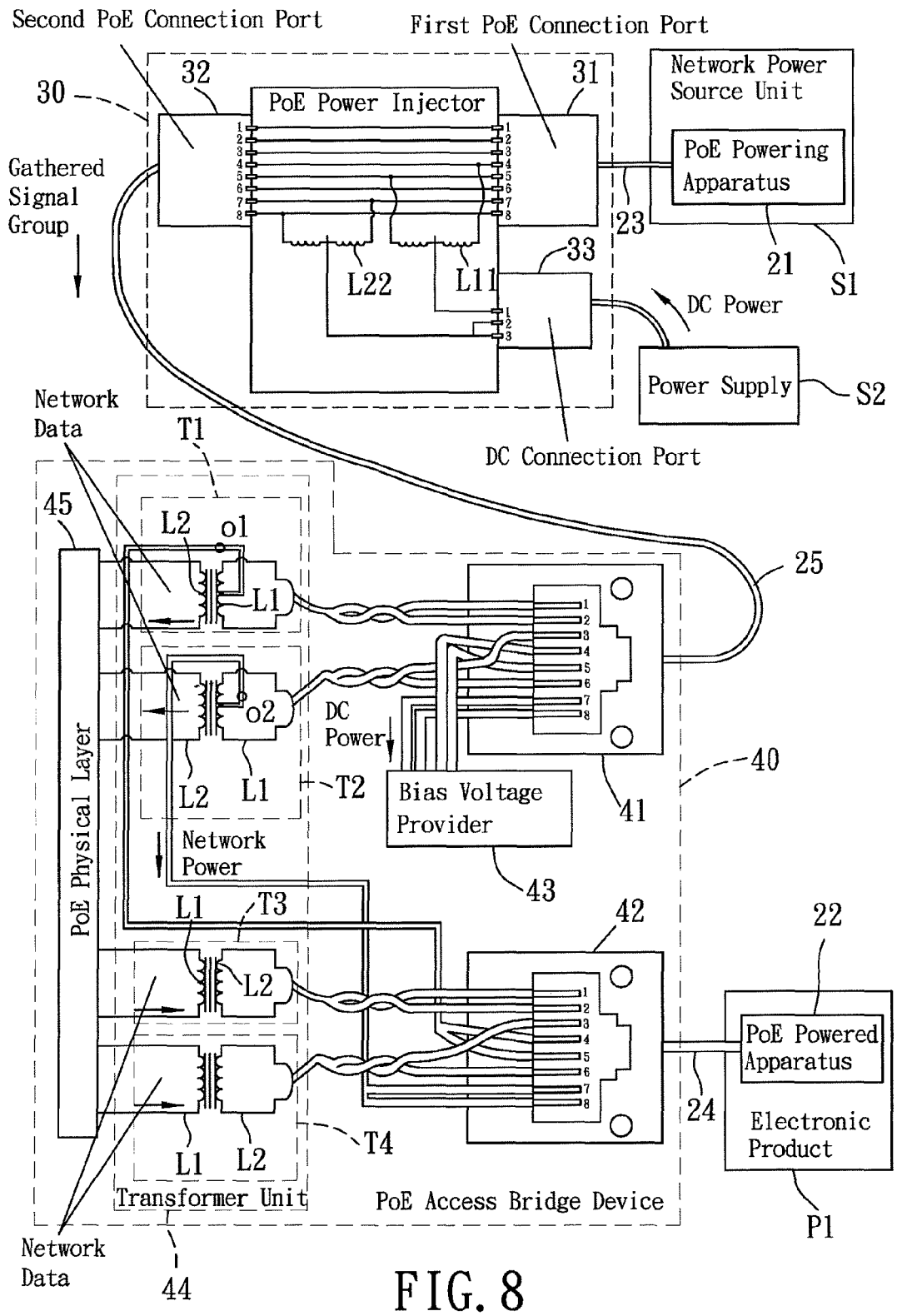
FIG. 8 is a schematic circuit diagram of the second embodiment of a PoE relay system of the present invention.

FIG. 8 shows the second embodiment of the PoE relay system of the present invention. The differences from the first embodiment reside in the following.

The PoE power injector 30 of the second embodiment includes the first PoE connection port 31, the second PoE connection port 32, the DC connection port 33, and first and second coils (L11, L22).

The first to eighth pins 1-8 of the second PoE connection port 32 of the PoE power injector 30 are respectively and electrically coupled to the first to eighth pins 1-8 of the first PoE connection port 31 of the PoE power injector 30 to receive the network data and the network power. The fourth, fifth, seventh and eighth pins 4, 5, 7, 8 of the first and second PoE connection ports 31, 32 are electrically coupled to the DC connection port 33 via the first and second coils (L11, L22) so as to receive the DC power.

The first coil (L11) is electrically coupled between the fourth and fifth pins 4, 5 of the first PoE connection port 31 of the PoE power injector 30, and has a center tap electrically coupled to the first pin 1 of the DC connection port 33.

The second coil (L22) is electrically coupled between the seventh and eighth pins 7, 8 of the first PoE connection port 31 of the PoE power injector 30, and has a center tap electrically coupled to the second and third pins 2, 3 of the DC connection port 33.

The transmission path of the above mentioned second embodiment of the present invention will be described in the following with an example. When 100 M/10 Mbps transmission speed is used, and with the PoE powering apparatus 21 of the network power source unit (S1) serving as the PoE powering apparatus 21 shown in FIG. 2, the network power is transmitted sequentially through the first, second third and sixth pins 1, 2, 3, 6 of the PoE powering apparatus 21, the first, second third and sixth pins 1, 2, 3, 6 of the first PoE connection port 31 of the PoE power injector 30, the first, second, third and sixth pins 1, 2, 3, 6 of the second PoE connection port 32 of the PoE power injector 30, the first, second, third and sixth pins 1, 2, 3, 6 of the first PoE connection port 41 of the PoE access bridge device 40, the primary windings (L1) of the first and second transformers (T1, T2), the first and second center taps (o1, o2), the fourth, fifth, seventh and eighth pins 4, 5, 7, 8 of the second PoE connection port 42 of the PoE access bridge device 40, and finally the fourth, fifth, seventh and eighth pins 4, 5, 7, 8 of the PoE powered apparatus 22 of the electronic product (P1). The DC power is transmitted sequentially through the DC connection port 33 of the PoE power injector 30, the first and second coils (L11, L22), the fourth, fifth, seventh and eighth pins 4, 5, 7, 8 of the second PoE connection port 32 of the PoE power injector 30, and the fourth, fifth, seventh and eighth pins 4, 5, 7, 8 of the first PoE connection port 41 of the PoE access bridge device 40, and finally to the bias voltage provider 43 of the PoE access bridge device 40.

The network data is transmitted sequentially through the first, second, third and sixth pins 1, 2, 3, 6 of the PoE powering apparatus 21, the first, second, third and sixth pins 1, 2, 3, 6 of the first PoE connection port 31 of the PoE power injector 30, the first, second, third and sixth pins 1, 2, 3, 6 of the second PoE connection port 32 of the PoE power injector 30, the first, second, third and sixth pins 1, 2, 3, 6 of the first PoE connection port 41 of the PoE access bridge device 40, the primary windings (L1) of the first and second transformers (T1, T2), the secondary windings (L2) of the first and second transformers (T1, T2), the PoE physical layer 45, the primary windings (L1) of the third and fourth transformers (T3, T4), the secondary windings (L2) of the third and fourth transformers (T3, T4), the first, second, third and sixth pins 1, 2, 3, 6 of the second PoE connection port 42 of the PoE access bridge device 40, and finally the first, second, third and sixth pins 1, 2, 3, 6 of the PoE powered apparatus 22 of the electronic product (P1).

When 1000 Mbps transmission speed is used and when the first to eighth pins 1-8 of the PoE powering apparatus 21 of the network power source unit (S1) are all used to transmit the network data and the network power (not shown in Figures), the PoE power injector 30 transmits the network data and the network power sequentially through the first, second, third, sixth, fourth, fifth, seventh and eighth pins 1, 2, 3, 6, 4, 5, 7, 8 of the first PoE connection port 31, and the first, second, third, sixth, fourth, fifth, seventh and eighth pins 1, 2, 3, 6, 4, 5, 7, 8 of the second PoE connection port 32 of the PoE power injector 30.

Figure 9:
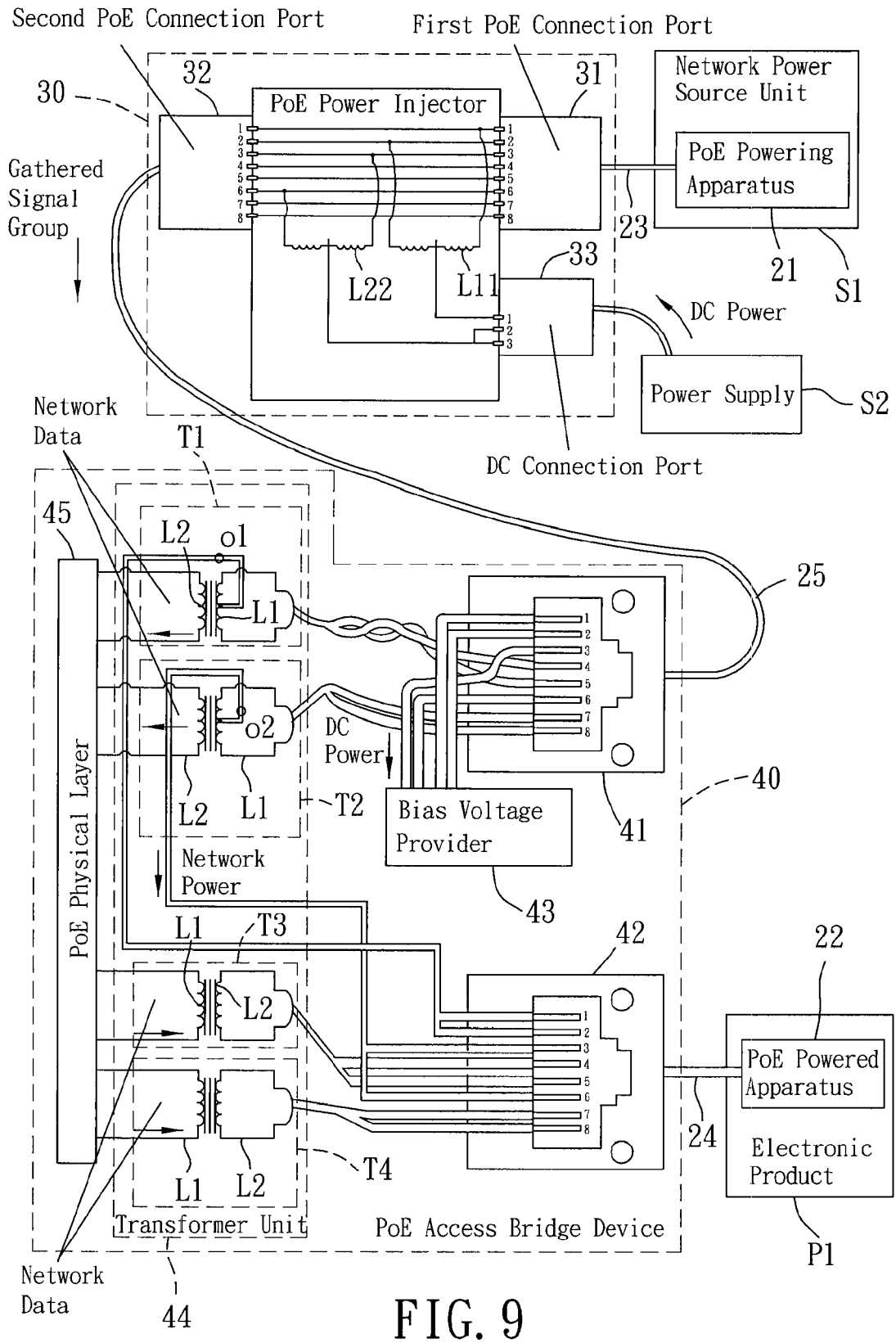
FIG. 9 is a schematic circuit diagram of a variant form of the second embodiment.

A variant form of the second embodiment of the present invention is shown in FIG. 9, and has the following differences from FIG. 8.

The first coil (L11) is electrically coupled between the first and second pins 1, 2 of the first PoE connection port 31 of the PoE power injector 30, and the second coil (L22) is electrically coupled between the third and sixth pins 3, 6 of the first PoE connection port 31 of the PoE power injector 30.

The bias voltage provider 43 is electrically coupled to the first, second, third and sixth pins 1, 2, 3, 6 of the first PoE connection port 41 of the PoE access bridge device 40 so as to receive the DC power.

The primary winding (L1) of the first transformer (T1) is electrically coupled between the fourth and fifth pins 4, 5 of the first PoE connection port 41 of the PoE access bridge device 40.

The primary winding (L1) of the second transformer (T2) is electrically coupled between the seventh and eighth pins 7, 8 of the first PoE connection port 41 of the PoE access bridge device 40.

The first center tap (o1) is electrically coupled to the first and second pins 1, 2 of the second PoE connection port 42 of the PoE access bridge device 40.

The second center tap (o2) is electrically coupled to the third and sixth pins 3, 6 of the second PoE connection port 42 of the PoE access bridge device 40.

The secondary winding (L2) of the third transformer (T3) is electrically coupled between the fourth and fifth pins 4, 5 of the second PoE connection port 42 of the PoE access bridge device 40.

The secondary winding (L2) of the fourth transformer (T4) is electrically between the seventh and eighth pins 7, 8 of the second PoE connection port 42 of the PoE access bridge device 40.

The transmission path of the above variant of the second embodiment of the present invention will be described in the following with an example. When 100 M/10 Mbps transmission speed is used, and with the PoE powering apparatus 21 of the network power source unit (S1) serving as the PoE powering apparatus 21 shown in FIG. 1, the network power is transmitted sequentially through the fourth, fifth, seventh and eighth pins 4, 5, 7, 8 of the PoE powering apparatus 21, the fourth, fifth, seventh and eighth pins 4, 5, 7, 8 of the first PoE connection port 31 of the PoE power injector 30, the fourth, fifth, seventh and eighth pins 4, 5, 7, 8 of the second PoE connection port 32 of the PoE power injector 30, the fourth, fifth, seventh and eighth pins 4, 5, 7, 8 of the first PoE connection port 41 of the PoE access bridge device 40, the primary windings (L1) of the first and second transformers (T1, T2), the first and second center taps (o1, o2), the first, second, third and sixth pins 1, 2, 3, 6 of the second PoE connection port 42 of the PoE access bridge device 40, and finally the first, second, third and sixth pins 1, 2, 3, 6 of the PoE powered apparatus 22 of the electronic product (P1).

The DC power is transmitted sequentially through the DC connection port 33 of the PoE power injector 30, the first and second coils (L11, L22), the first, second, third and sixth pins 1, 2, 3, 6 of the second PoE connection port 32 of the PoE power injector 30, and the first, second, third and sixth pins 1, 2, 3, 6 of the first PoE connection port 41 of the PoE access bridge device 40, and finally to the bias voltage provider 43. The network data is transmitted sequentially through the first, second, third and sixth pins 1, 2, 3, 6 of the first PoE connection port 31, the first, second, third and sixth pins 1, 2, 3, 6 of the second PoE connection port 32, and the PoE access bridge device 40.

When 1000 Mbps transmission speed is used and when the first to eighth pins 1-8 of the PoE powering apparatus 21 of the network power source unit (S1) are used to transmit the network data and the network power (not shown in Figures), the PoE power injector 30 transmits the network data and the network power respectively through the first, second, third, sixth, fourth, fifth, seventh and eighth pins 1, 2, 3, 6, 4, 5, 7, 8 of the first PoE connection port 31, and the first, second, third, sixth, fourth, fifth, seventh and eighth pins 1, 2, 3, 6, 4, 5, 7, 8 of the second PoE connection port 32 of the PoE power injector 30.

Figure 10:
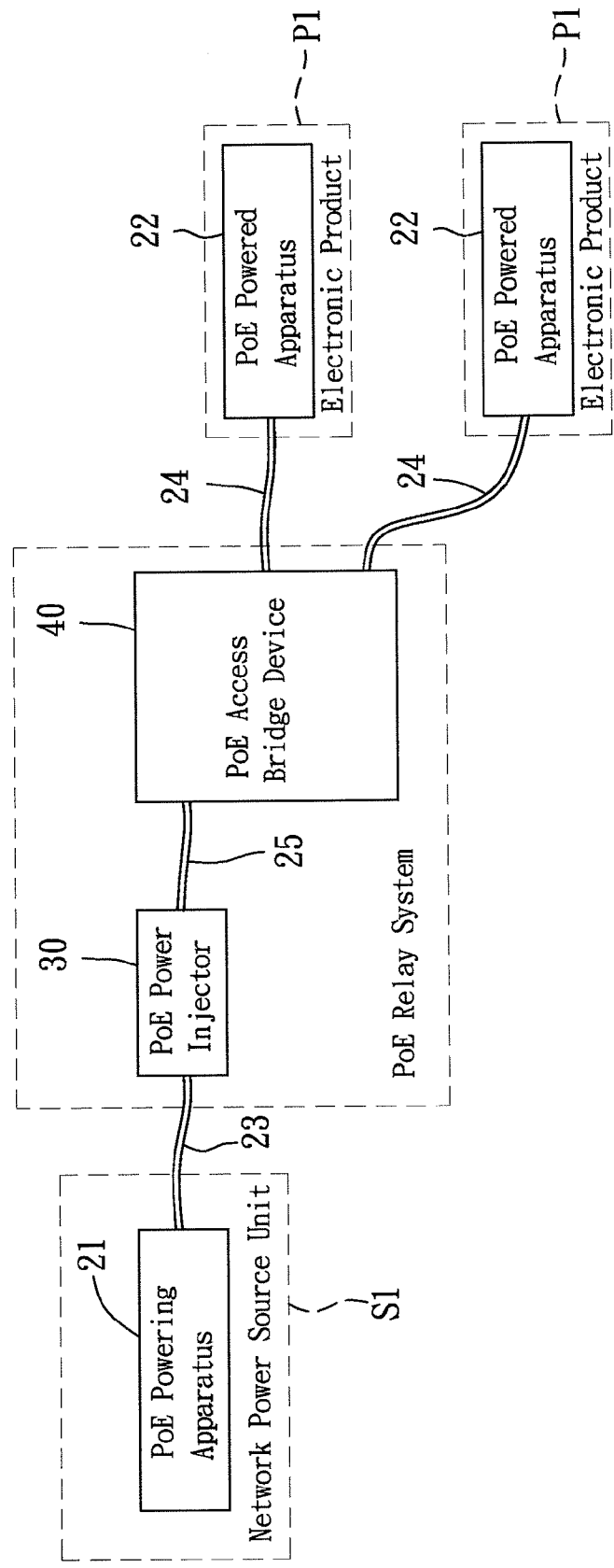
FIG. 10 a circuit diagram of the third embodiment of a PoE relay system of the present invention.

FIG. 10 shows the third embodiment of the PoE relay system of the present invention. The differences from the first and second preferred embodiments reside in the following.

The network power generated from the PoE powering apparatus 21 of the network power source unit (S1) is used to power PoE powered apparatuses 22 of multiple electronic products (P1) via multiple second networking cables 24 (for simplification, only two electronic products (P1) are shown).

The PoE access bridge device 40 includes multiple second PoE connection ports 42 (referring to FIGS. 6-9) and multiple groups of third and fourth transformers (T3, T4) (referring to FIGS. 6-9), each group being electrically coupled to a corresponding one of the multiple second PoE connection ports 42. The PoE physical layer 45 (referring to FIGS. 6-9) divides the received network data to be delivered through the second PoE connection ports 42, the second networking cables 24 to the PoE powered apparatus 22 of the electronic products (P1) via the corresponding groups of the third and fourth transformers (T3, T4) so that each of the electronic products (P1) receives the required power.

Figure 4:
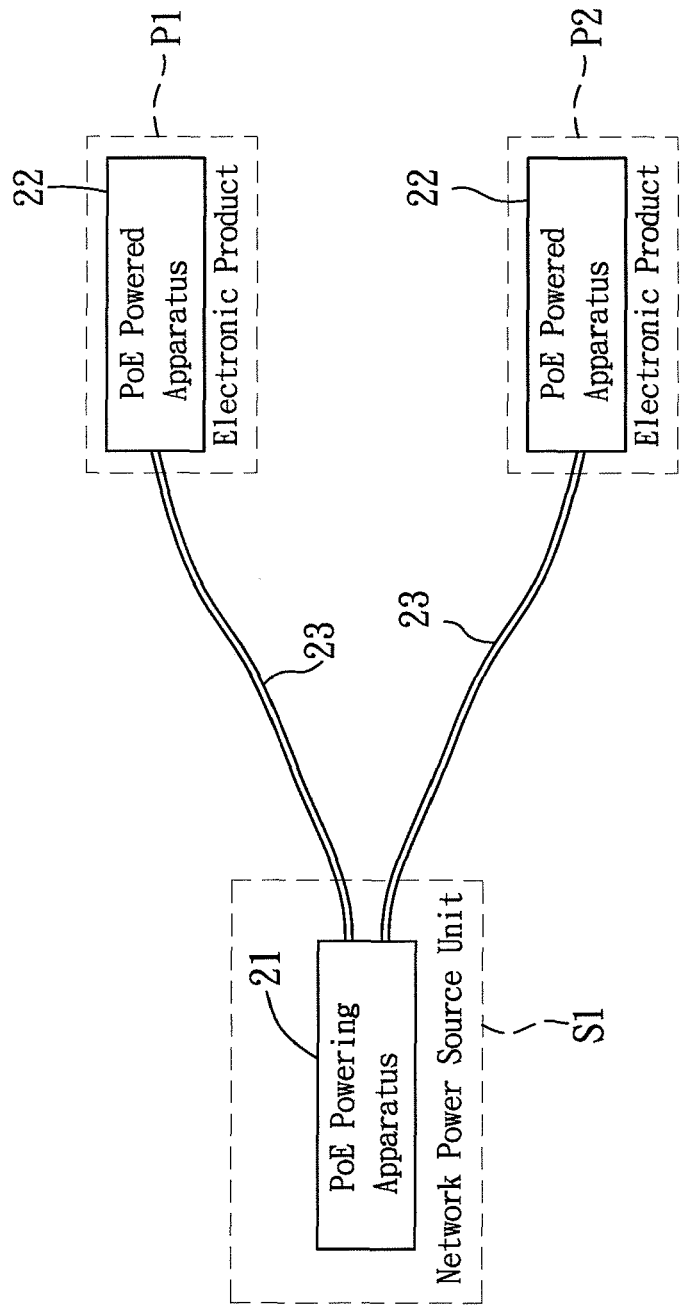
FIG. 4 is a schematic block diagram of a first conventional embodiment of a one-to-many application for a PoE powering system.
Figure 5:
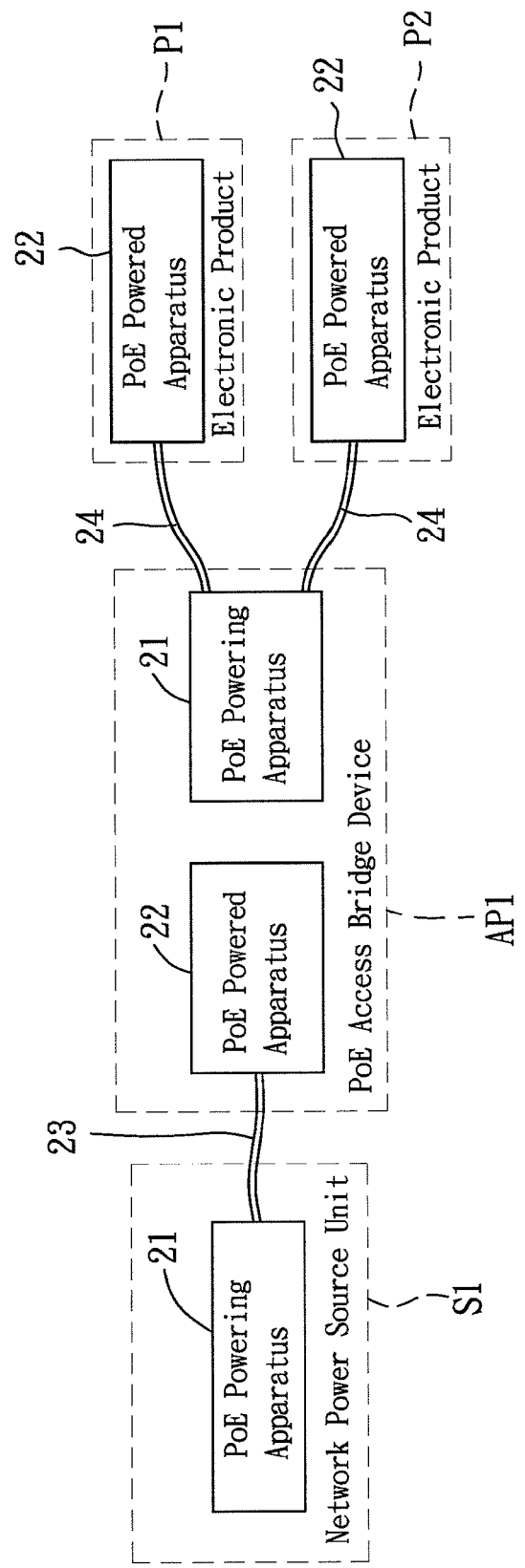
FIG. 5 is a schematic block diagram of a second conventional embodiment of a one-to-many application for a PoE powering system.

The above mentioned embodiments of the present invention have the following advantages:

1. Comparing with the first conventional example shown in FIG. 4, there is no need for a lengthy networking cable 23. Comparing with the second conventional example shown in FIG. 5, the PoE access bridge device 40 of the present invention uses the first and second transformers (T1, T2) to separate the network power and the network data so that the electronic device (P1) receives the needed power via the second networking cable 24, instead of having to provide additional costly PoE powering apparatus 21 and PoE powered apparatus 22 within the PoE relay system.

2. By using four pins or eight pins to transmit network data, the PoE power injector device 30 of the second embodiment simultaneously complies with the specifications of having transmission speeds of 10 Mbps, 100 Mbps and 1000 Mbps.

3. Since the DC power is 15V, which is lower than the network power of 36V-57V, the PoE access bridge device 40 can save the cost of providing a step-down converter while still getting the needed power.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A Power-over-Ethernet (PoE) relay system adapted to be electrically connected to a network power source unit including a PoE powering apparatus, a power supply to provide direct current (DC) power, and to an electronic product including a PoE powered apparatus, the PoE powering apparatus providing network data and network power carried on the network data, said PoE relay system comprising:
a first networking cable;
a PoE power injector adapted to be electrically coupled to the PoE powering apparatus via a second networking cable to receive the network data and the network power therefrom, further adapted to be electrically coupled to the power supply to receive the DC power therefrom, and gathering the network data, the network power and the DC power in a gathered signal group; and
a PoE access bridge device electrically coupled to said PoE power injector via said first networking cable to receive the gathered signal group therefrom, and adapted to be electrically coupled to the electronic product, said PoE access bridge device receiving the DC power from the gathered signal group for operation, separating the network data and the network power of the gathered signal group from each other, and outputting the network power to the PoE powered apparatus of the electronic product via a third networking cable;
wherein the DC power provided by the power supply has a voltage magnitude lower than that of the network power and conforming to a specification of a bias voltage of said PoE access bridge device, and said PoE access bridge device is configured to directly use the DC power to be needed power of said PoE access bridge device.

2. The PoE relay system as claimed in claim 1, wherein said PoE access bridge device includes:
a first PoE connection port coupled to said PoE power injector via said first networking cable to receive the gathered signal group therefrom;
a bias voltage provider electrically coupled to said first PoE connection port to receive the DC power from the gathered signal group;
a transformer unit electrically coupled to said first PoE connection port to receive the network data and the network power of the gathered signal group therefrom, separating the network data and network power, and outputting the network power; and a second PoE connection port electrically coupled to said transformer unit to receive the network power therefrom, and adapted to be electrically coupled to the PoE powered apparatus of the electronic product via the third networking cable to output the network power thereto via said third networking cable.

3. The PoE relay system as claimed in claim 2, wherein:
said first PoE connection port of said PoE access bridge device has first to eighth pins;
said transformer unit is electrically coupled to said first, second, third and sixth pins of said first PoE connection port of said PoE access bridge device to receive the network data and the network power of the gathered signal group therefrom;
said bias voltage provider is electrically coupled to said fourth, fifth, seventh and eighth pins of said first PoE connection port of said PoE access bridge device to receive the DC power of the gathered signal group; and
said second PoE connection port of said PoE access bridge device has first to eighth pins, said fourth, fifth, seventh and eighth pins of said second PoE connection port being electrically coupled to said transformer unit to receive the network power therefrom.

4. The PoE relay system as claimed in claim 3, wherein said PoE access bridge device further includes:
a PoE physical layer electrically coupled to said transformer unit to receive the network data therefrom, and delivering the network data back to said transformer unit for subsequent output by said transformer unit to said first, second, third and sixth pins of said second PoE connection port of said PoE access bridge device.

5. The PoE relay system as claimed in claim 4, wherein said transformer unit includes:
a first transformer having
a primary winding electrically coupled to said first and second pins of said first PoE connection port of said PoE access bridge device,
a secondary winding electrically coupled to said PoE physical layer, and
a first center tap disposed in the middle of said primary winding of said first transformer, and electrically coupled to said fourth and fifth pins of said second PoE connection port of said PoE access bridge device;
a second transformer having
a primary winding electrically coupled to said third and sixth pins of said first PoE connection port of said PoE access bridge device,
a secondary winding electrically coupled to said PoE physical layer, and
a second center tap disposed in the middle of said primary winding of said second transformer, and electrically coupled to said seventh and eighth pins of said second PoE connection port of said PoE access bridge device;
a third transformer having
a primary winding electrically coupled to said PoE physical layer, and
a secondary winding electrically coupled between said first and second pins of said second PoE connection port of said PoE access bridge device; and
a fourth transformer having
a primary winding electrically coupled to said PoE physical layer, and
a secondary winding electrically coupled between said third and sixth pins of said second PoE connection port of said PoE access bridge device;
wherein, said primary windings of said first and second transformers receive the network power and the network data of the gathered signal group from said first PoE connection port of said PoE access bridge device, the network power being extracted by said first and second center taps so as to be delivered to said second PoE connection port of said PoE access bridge device via said fourth, fifth, seventh and eighth pins of said second PoE connection port, the network data being delivered to said PoE physical layer by induction between said primary and secondary windings of each of said first and second transformers; and
wherein, said primary windings of said third and fourth transformers receive the network data from said PoE physical layer, and the network data is delivered to said second PoE connection port of said PoE access bridge device by induction between said primary and secondary windings of each of said third and fourth transformers.

6. The PoE relay system as claimed in claim 2, wherein:
said first PoE connection port of said PoE access bridge device has first to eighth pins;
said transformer unit is electrically coupled to said fourth, fifth, seventh and eighth pins of said first PoE connection port of the PoE access bridge device to receive the network data and the network power of the gathered signal group therefrom;
said bias voltage provider is electrically coupled to said first, second, third and sixth pins of said first PoE connection port of said PoE access bridge device to receive the DC power of the gathered signal group;
said second PoE connection port of said PoE access bridge device has first to eighth pins, said first, second, third and sixth pins of said second PoE connection port being electrically coupled to said transformer unit to receive the network power therefrom.

7. The PoE relay system as claimed in claim 6, wherein said PoE access bridge device further includes a PoE physical layer, and said transformer unit of said PoE access bridge device includes:
a first transformer having
a primary winding electrically coupled to said fourth and fifth pins of said first PoE connection port of said PoE access bridge device,
a secondary winding electrically coupled to said PoE physical layer, and
a first center tap disposed in the middle of said primary winding of said first transformer, and electrically coupled to said first and second pins of said second PoE connection port of said PoE access bridge device;
a second transformer having
a primary winding electrically coupled to said seventh and eighth pins of said first PoE connection port of said PoE access bridge device,
a secondary winding electrically coupled to said PoE physical layer, and
a second center tap disposed in the middle of said primary winding of said second transformer, and electrically coupled to said third and fourth pins of said second PoE connection port of said PoE access bridge device;
a third transformer having
a primary winding electrically coupled to said PoE physical layer,
a secondary winding electrically coupled between said fourth and fifth pins of said second PoE connection port of said PoE access bridge device; and
a fourth transformer having
a primary winding electrically coupled to said PoE physical layer, and
a secondary winding electrically coupled between said seventh and eighth pins of said second PoE connection port of said PoE access bridge device.

8. The PoE relay system as claimed in claim 1, wherein said PoE power injector includes:
a first PoE connection port adapted to be electrically coupled to the PoE powering apparatus via the second networking cable to receive the network data and the network power therefrom;
a direct current (DC) connection port adapted to be electrically coupled to the power supply to receive the DC power therefrom; and
a second PoE connection port electrically coupled to said first PoE connection port of said PoE power injector to receive the network data and network power therefrom, electrically coupled to said DC connection port to receive the DC power therefrom, and gathering the network data, the network power and the DC power into a gathered signal group.

9. The PoE relay system as claimed in claim 8, wherein:
each of said first and second PoE connection ports of said PoE power injector has first to eighth pins, said first, second, third and sixth pins of said first PoE connection port of said PoE power injector receiving the network data and the network power from the PoE powering apparatus via the second networking cable; and
said first, second, third and sixth pins of said second PoE connection port of said PoE power injector are respectively and electrically coupled to said first, second, third and sixth pins of said first PoE connection port of said PoE power injector to receive the network data and the network power therefrom.

10. The PoE relay system as claimed in claim 9, wherein said DC connection port has a first pin, a second pin and a third pin; wherein said PoE power injector further includes
a first diode having an anode electrically coupled to said first pin of said DC connection port, and a cathode electrically coupled to said fourth and fifth pins of said second PoE connection port of said PoE power injector, and
a second diode having an anode electrically coupled to said seventh and eighth pins of said second PoE connection port of said PoE power injector, and a cathode electrically coupled to said second and third pins of said DC connection port; and
wherein said first and second diodes switch between conducting and non-conducting states according to a voltage magnitude of the DC power, and allow for the DC power to be delivered from said DC connection port to said second PoE connection port of said PoE power injector when in the conducting state.

11. The PoE relay system as claimed in claim 8, wherein each of said first and second PoE connection ports of said PoE power injector has first to eighth pins, said fourth, fifth, seventh and eighth pins of said first PoE connection port of said PoE power injector being respectively and electrically coupled to said fourth, fifth, seventh and eighth pins of said second PoE connection port of said PoE power injector.

12. The PoE relay system as claimed in claim 11, wherein said DC connection port has a first pin, a second pin, and a third pin, and said PoE power injector further includes
a first diode having an anode electrically coupled to said first pin of said DC connection port, and a cathode electrically coupled to said first and second pins of said second PoE connection port of said PoE power injector, and
a second diode having an anode electrically coupled to said third and sixth pins of said second PoE connection port of said PoE power injector, and a cathode electrically coupled to said second and third pins of said DC connection port; and
wherein said first and second diodes switch between conducting and non-conducting states according to a voltage magnitude of the DC power, and allows for the DC power to be delivered from said DC connection port to said second PoE connection port of said PoE power injector when in the conducting state.

13. The PoE relay system as claimed in claim 8, wherein each of said first and second PoE connection ports of said PoE power injector has first to eighth pins, said first to eighth pins of said second PoE connection port of said PoE power injector being respectively and electrically coupled to said first to eighth pins of said first PoE connection port of said PoE power injector.

14. The PoE relay system as claimed in claim 13, wherein said DC connection port has a first pin, a second pin, and a third pin; and
wherein said PoE power injector further includes
a first coil electrically coupled between said fourth and fifth pins of said first PoE connection port of said PoE power injector, and having a first center tap that is electrically coupled to said first pin of said DC connection port, and a second coil electrically coupled between said seventh and eighth pins of said first PoE connection port of said PoE power injector, and having a second center tap that is electrically coupled to said second and third pins of said DC connection port.

15. The PoE relay system as claimed in claim 13, wherein said DC connection port has a first pin, a second pin and a third pin; and
wherein said PoE power injector further includes:
a first coil electrically coupled between said first and second pins of said first PoE connection port of said PoE power injector, and having a first center tap that is electrically coupled to said first pin of said DC connection port; and
a second coil electrically coupled between said third and sixth pins of said first PoE connection port of said PoE power injector, and having a second center tap that is electrically coupled to said second and third pins of said DC connection port.

16. A Power-over-Ethernet (PoE) access bridge device adapted to receive a gathered signal group and to be electrically coupled to an electronic product including a PoE powered apparatus, the gathered signal group including network data and network power provided by a PoE powering apparatus, and direct current (DC) power provided by a power supply, said PoE access bridge device comprising:
a first PoE connection port adapted to be electrically coupled to a networking cable to receive the gathered signal group;
a bias voltage provider electrically coupled to said first PoE connection port to receive the DC power from the gathered signal group, wherein the DC power has a voltage magnitude lower than that of the network power and conforming to a specification of a bias voltage of said PoE access bridge device, and said bias voltage provider is configured to directly provide the DC power as needed power of said PoE access bridge device;
a transformer unit electrically coupled to said first PoE connection port to receive the network data and the network power of the gathered signal group therefrom, separating the network data and network power, and outputting the network power; and a second PoE connection port electrically coupled to said transformer unit to receive the network power therefrom, and adapted to be electrically coupled to the PoE powered apparatus of the electronic product via another networking cable for outputting the network power thereto.

17. The PoE access bridge device as claimed in claim 16, wherein:
said first PoE connection port has first to eighth pins;
said transformer unit is electrically coupled to said first, second, third and sixth pins of said first PoE connection port to receive the network data and the network power of the gathered signal group therefrom;
said bias voltage provider is electrically coupled to said fourth, fifth, seventh and eighth pins of said first PoE connection port to receive the DC power of the gathered signal group; and
said second PoE connection port has first to eighth pins, said fourth, fifth, seventh and eighth pins of said second PoE connection port being electrically coupled to said transformer unit to receive the network power therefrom.

18. The PoE access bridge device as claimed in claim 17, further comprising:
a PoE physical layer electrically coupled to said transformer unit to receive the network data therefrom, and delivering the network data back to said transformer unit for subsequent output by said transformer unit to said first, second, third and sixth pins of said second PoE connection port.

19. The PoE access bridge device as claimed in claim 18, wherein said transformer unit includes:
a first transformer having
a primary winding electrically coupled to said first and second pins of said first PoE connection port,
a secondary winding electrically coupled to said PoE physical layer, and
a first center tap disposed in the middle of said primary winding of said first transformer, and electrically coupled to said fourth and fifth pins of said second PoE connection port;
a second transformer having
a primary winding electrically coupled to said third and sixth pins of said first PoE connection port,
a secondary winding electrically coupled to said PoE physical layer, and
a second center tap disposed in the middle of said primary winding of said second transformer, and electrically coupled to said seventh and eighth pins of said second PoE connection port;
a third transformer having
a primary winding electrically coupled to said PoE physical layer, and
a secondary winding electrically coupled between said first and second pins of said second PoE connection port; and
a fourth transformer having
a primary winding electrically coupled to said PoE physical layer, and
a secondary winding electrically coupled between said third and sixth pins of said second PoE connection port;
wherein, said primary windings of said first and second transformers receive the network power and the network data of the gathered signal group from said first PoE connection port, the network power being extracted by said first and second center taps so as to be delivered to said second PoE connection port via said fourth, fifth, seventh and eighth pins of said second PoE connection port, the network data being delivered to said PoE physical layer by induction between said primary and secondary windings of each of said first and second transformers; and
wherein, said primary windings of said third and fourth transformers receive the network data from said PoE physical layer, and the network data is delivered to said second PoE connection port by induction between said primary and secondary windings of each of said third and fourth transformers.

20. The PoE access bridge device as claimed in claim 16, wherein:
said first PoE connection port has first to eighth pins;
said transformer unit is electrically coupled to said fourth, fifth, seventh and eighth pins of said first PoE connection port to receive the network data and the network power of the gathered signal group therefrom;
said bias voltage provider is electrically coupled to said first, second, third and sixth pins of said first PoE connection port to receive the DC power of the gathered signal group;
said second PoE connection port has first to eighth pins, said first, second, third and sixth pins of said second PoE connection port being electrically coupled to said transformer unit to receive the network power therefrom.

21. The PoE access bridge device as claimed in claim 20, further comprising a PoE physical layer, wherein said transformer unit includes:
- a first transformer having
  - a primary winding electrically coupled to said fourth and fifth pins of said first PoE connection port,
  - a secondary winding electrically coupled to said PoE physical layer, and
  - a first center tap disposed in the middle of said primary winding of said first transformer, and electrically coupled to said first and second pins of said second PoE connection port;
- a second transformer having
  - a primary winding electrically coupled to said seventh and eighth pins of said first PoE connection port,
  - a secondary winding electrically coupled to said PoE physical layer, and
  - a second center tap disposed in the middle of said primary winding of said second transformer, and electrically coupled to said third and fourth pins of said second PoE connection port;
- a third transformer having
  - a primary winding electrically coupled to said PoE physical layer,
  - a secondary winding electrically coupled between said fourth and fifth pins of said second PoE connection port; and
- a fourth transformer having
  - a primary winding electrically coupled to said PoE physical layer, and
  - a secondary winding electrically coupled between said seventh and eighth pins of said second PoE connection port.

* * * * *

UNITED STATES PATENT AND TRADEMARK OFFICE
CERTIFICATE OF CORRECTION

PATENT NO. : 9,184,922 B2  
APPLICATION NO. : 13/426895  
DATED : November 10, 2015  
INVENTOR(S) : Yi-Chang Tsai et al.

It is certified that error appears in the above-identified patent and that said Letters Patent is hereby corrected as shown below:

On the title page item (75) line 2, second Inventor: change "Kuo-Hong Tseng" to --Kuo-Hung Tseng--.

Signed and Sealed this  
Twenty-sixth Day of April, 2016

Michelle K. Lee  
*Director of the United States Patent and Trademark Office*